(12) United States Patent
Miwa et al.

(10) Patent No.: US 10,931,160 B2
(45) Date of Patent: Feb. 23, 2021

(54) ACTUATOR

(71) Applicant: MURAKAMI CORPORATION, Shizuoka (JP)

(72) Inventors: Hiroya Miwa, Shizuoka (JP); Akira Fukai, Shizuoka (JP); Fumitaka Kitagawa, Shizuoka (JP)

(73) Assignee: MURAKAMI CORPORATION, Shizuoka (JP)

( * ) Notice: Subject to any disclaimer, the term of this patent is extended or adjusted under 35 U.S.C. 154(b) by 22 days.

(21) Appl. No.: 15/923,251

(22) Filed: Mar. 16, 2018

(65) Prior Publication Data

US 2018/0269745 A1 Sep. 20, 2018

(30) Foreign Application Priority Data

Mar. 17, 2017 (JP) .............................. JP2017-052470

(51) Int. Cl.
| | | |
|---|---|---|
| *H02K 5/20* | (2006.01) | |
| *H01R 13/627* | (2006.01) | |
| *H02K 7/116* | (2006.01) | |
| *H02K 5/10* | (2006.01) | |
| *B60L 53/16* | (2019.01) | |
| *H01R 13/639* | (2006.01) | |

(52) U.S. Cl.
CPC ................ *H02K 5/20* (2013.01); *B60L 53/16* (2019.02); *H01R 13/6272* (2013.01); *H02K 5/10* (2013.01); *H02K 7/116* (2013.01); *H01R 13/6397* (2013.01)

(58) Field of Classification Search
CPC ............. H02K 5/10; H02K 5/20; H02K 7/116
USPC ........................................... 310/83, 418–433
See application file for complete search history.

(56) References Cited

U.S. PATENT DOCUMENTS

| | | | | |
|---|---|---|---|---|
| 10,665,992 B2* | 5/2020 | Miwa | ............... | H01R 13/62927 |
| 2008/0191569 A1* | 8/2008 | Lampert | .................. | H02K 5/10 |
| | | | | 310/88 |
| 2013/0154413 A1* | 6/2013 | Schweichart | ........ | H02K 7/1166 |
| | | | | 310/88 |

(Continued)

FOREIGN PATENT DOCUMENTS

| | | |
|---|---|---|
| JP | 62-46744 A | 2/1987 |
| JP | 2014-110691 | 6/2014 |

OTHER PUBLICATIONS

Office Action issued in Japanese family member Patent Appl. No. 2017-052470, dated Sep. 15, 2020, along with an English translation thereof.

*Primary Examiner* — Quyen P Leung
*Assistant Examiner* — Minki Chang
(74) *Attorney, Agent, or Firm* — Greenblum & Bernstein, P.L.C.

(57) ABSTRACT

An actuator is provided that is smaller in size and has a simpler structure, as compared with a conventional one. The actuator is composed of a driving mechanism that includes an electric motor, and a housing that houses the driving mechanism. The housing includes an air hole that communicates the inside of the housing with the outside thereof, a filter that covers the air hole, and a motor box that surrounds the electric motor. At least one of members of the motor box acts as a scattering prevention wall that prevents lubricant from scattering to the electric motor. The air hole is formed in a member of the motor box other than said at least one of members of the motor box.

6 Claims, 11 Drawing Sheets

(56) References Cited

U.S. PATENT DOCUMENTS

2014/0339939 A1* 11/2014 Illingworth ............. H02K 5/10
310/88
2015/0129686 A1* 5/2015 Rempp ................... F16K 11/20
239/569
2019/0277391 A1* 9/2019 Yoshimura ............. H02K 7/116

* cited by examiner

ACTUATOR

CROSS-REFERENCE TO RELATED APPLICATION

This application claims the benefit of priority to Japanese Patent Application No. 2017-052470 filed 17 Mar. 2017, the disclosures of all of which are hereby incorporated by reference in their entireties.

TECHNICAL FIELD

The present invention relates to an actuator.

BACKGROUND ART

When a storage battery mounted on a vehicle such as an electric vehicle or a hybrid vehicle is charged, a charging connector for a charging cable is attached to a power receiving connector provided in a vehicle body to feed power through the charging cable to the storage battery. Normally, a locking mechanism is provided at the power receiving connector for preventing the charging connector from coming off the power receiving connector.

An example of such a locking mechanism is one that includes: a hook arranged at a front edge of a charging connector; an engaging projection formed at a front edge of a power receiving connector; and an actuator arranged above the power receiving connector (see Japanese Patent Application Publication No. 2014-110691, for example).

The actuator includes: a housing that houses a driving mechanism; and a lock pin that protrudes from a front surface of the housing. The lock pin is movable forward and backward in the front-rear direction with respect to the housing (that is, in a direction of plugging the charging connector).

In the above-described locking mechanism, as the charging connector is plugged into the power receiving connector, the hook abutting on the engaging projection tilts upward. Once the hook moves over the engaging projection, the hook tilts downward to engage with the hook and the engaging projection. Then, the lock pin moves forward with respect to the housing to have the front portion of the lock pin arranged above the hook of the charging connector. This allows the lock pin to restrict tilting motion of the hook so as to fix the hook in a state of being engaged with the engaging projection of the power receiving connector, so that the charging connector is prevented from coming off the power receiving connector while power is being fed.

In addition, the housing is formed with an air hole for allowing the inside of the housing to communicate with the outside thereof so as to avoid an increase in air pressure because of heat generated by an electric motor and electronic components in the driving mechanism, and is arranged with a filter for covering the air hole. In order to prevent grease (lubricant) applied to gears in the driving mechanism from flowing into meshes of the filter to block the meshes, an air path in a labyrinth shape is formed between the air hole and the space where the gears are housed. This prevents grease from scattering to the filter and the air hole to block the meshes of the filter.

SUMMARY OF THE INVENTION

Problems to be Solved

The conventional housing described above is formed with an air path in a labyrinth shape or the like in the vicinity of the air hole for preventing the grease from scattering to the filter and the air hole, to have a problem that the actuator is accordingly increased in size. In addition, forming an air path in a labyrinth shape causes the housing to have a complicated structure, and increases costs of the housing mold.

The present invention is intended to solve the above-mentioned problems, and to provide an actuator that is reduced in size and has a simpler structure as compared with a conventional one.

Solution to Resolve Problems

In order to solve the problem, the present invention provides an actuator composed of a driving mechanism that includes an electric motor, and a housing that houses the driving mechanism. The housing includes an air hole that communicates the inside of the housing with the outside thereof, a filter that covers the air hole, and a motor box that surrounds the electric motor. At least one of members of the motor box acts as a scattering prevention wall that prevents lubricant from scattering to the electric motor. The air hole is formed in a member of the motor box other than said at least one of members.

According to the present invention, lubricant is prevented from scattering to the filter and the air hole, even when an air path in a labyrinth shape is not separately arranged. This allows the actuator to be reduced in size and to have a simple structure.

The motor box preferably includes a ceiling, a bottom, and a peripheral wall, and the air hole is formed in at least one of the ceiling and the bottom.

This allows air warmed by the electric motor to be quickly discharged to the outside. Accordingly, effects of dissipating heat of the electric motor are improved.

The air hole is preferably oriented in a direction of assembling the electric motor.

This allows the electric motor to be assembled to the housing in the same direction as the filter. This improves assembling performance of the electric motor and the filter.

The housing preferably includes a lower housing on the lower side and an upper housing on the upper side, and the air hole is oriented in a direction of assembling the upper housing to the lower housing.

This allows the air hole to be formed in a direction of clamping and demolding the mold for molding the lower housing and the upper housing, to simplify the structure of the mold for the housing. This reduces manufacturing costs of the mold.

Advantageous Effects of the Invention

The actuator according to the present invention is smaller in size and has a simpler structure, as compared with a conventional one.

EMBODIMENTS OF THE INVENTION

Embodiments of the present invention will be described in detail, with reference to the drawings as appropriate. Note that in the following description, "up and down," "front and rear," "right and left" of an actuator 10 are set for the purpose of convenience in describing the structure of the actuator 10, and are not intended to limit an orientation of the actuator 10 or the like.

<Configuration of Actuator>

Figure 1:
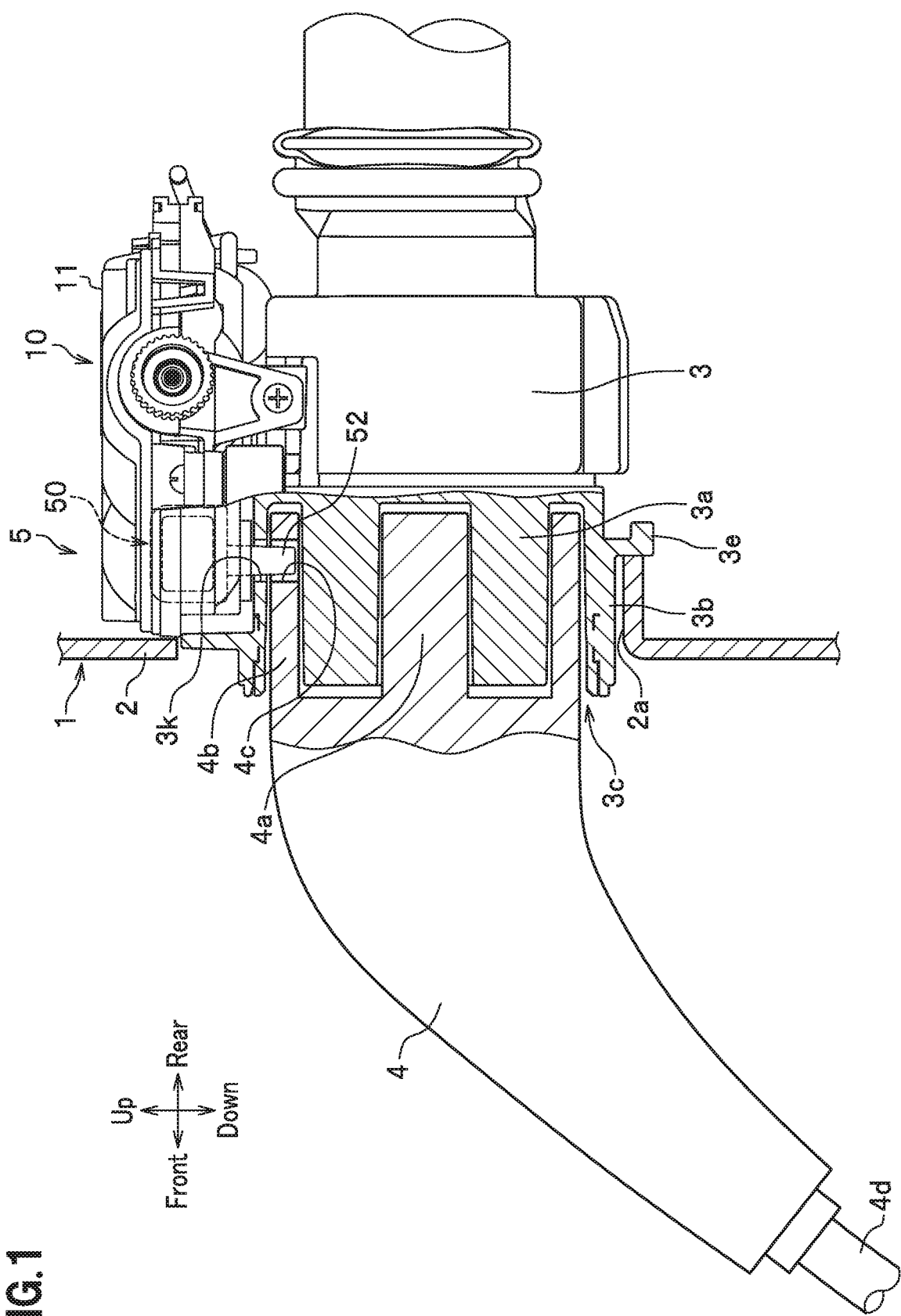
FIG. 1 is a side view of an actuator according to an embodiment of the present invention being used, with a power receiving connector and a charging connector partly shown in a sectional view.

As shown in FIG. 1, the actuator 10 of the present embodiment constitutes a locking mechanism 5 that is mounted in a charging port 2a of a vehicle 1 such as an electric vehicle and a hybrid vehicle. The locking mechanism 5 prevents a charging connector 4 (sometimes referred to as "charging gun") from coming off a power receiving connector 3 (sometimes referred to as "inlet"), while a storage battery (not shown) mounted on the vehicle 1 is charged.

The power receiving connector 3 is electrically connected to the storage battery (not shown) via a cable (not shown). The charging connector 4 is electrically connected to a charging device (not shown), such as a charging station, via a charging cable 4d. The charging port 2a is a space for accommodating the front end of the power receiving connector 3 and is formed at a specific position (for example, a front portion) of a vehicle body 2.

Figure 2:
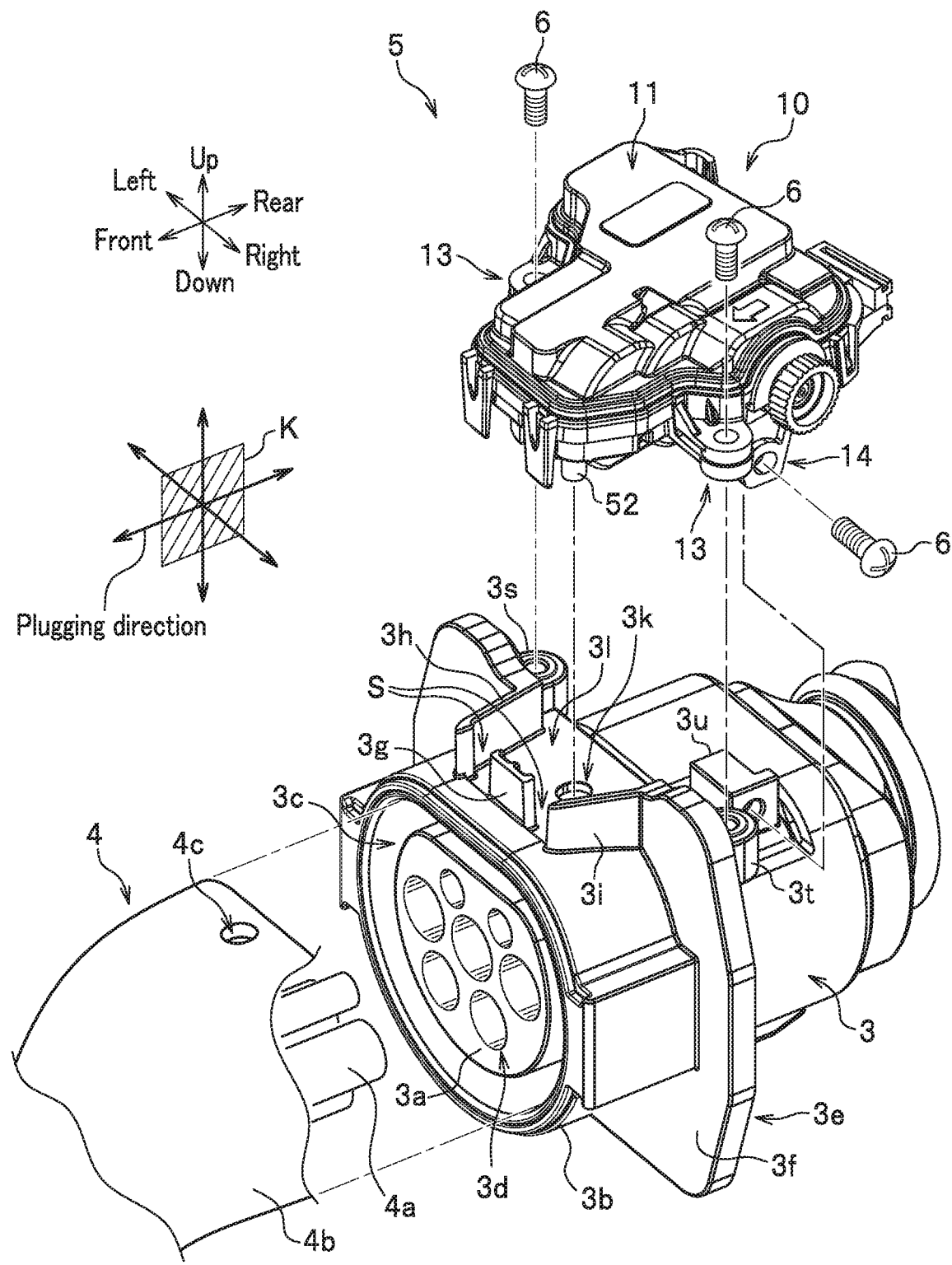
FIG. 2 is an exploded perspective view of a locking mechanism according to the embodiment and its surroundings.

As shown in FIG. 2, two or more convex terminals 4a having a columnar shape are formed at the front end of the charging connector 4. The convex terminal 4a feeds therethrough a large current supplied from a charging device (not shown), such as a charging station, to the vehicle 1. A cylindrical protective cover 4b having a predetermined thickness is formed around the convex terminals 4a. The protective cover 4b is open at the front end and accommodates the convex terminals 4a therein in a state that the convex terminals 4a are exposed to the outside. The protective cover 4b is formed, on its upper portion, with a fitting hole 4c into which a lock pin 52 protruding downward from the actuator 10 fits. The fitting hole 4c is a part of the locking mechanism 5.

As shown in FIG. 2, the power receiving connector 3 is formed, at its front end, with a concave terminal 3a in a substantially columnar shape that has two or more holes 3d formed therein. The concave terminal 3a is fitted to the convex terminal 4a of the charging connector 4 to take in a large current supplied from a charging device (not shown) such as a charging station. A cylindrical protective cover 3b is formed around the concave terminal 3a and accommodates the concave terminal 3a therein. A gap 3c is defined between the concave terminal 3a and the protective cover 3b so that the protection cover 4b is fitted to the gap 3c in a state where the concave terminal 3a is fitted to the convex terminals 4a (see FIG. 1).

The protective cover 3b is formed, on its outer peripheral surface, with a flange 3e. The flange 3e mainly includes a main body 3f, a front wall 3g, and side walls 3h, 3i. The main body 3f is a plate-like member formed on the right side, the left side, and the lower side of the power receiving connector 3. The main body 3f is formed thereon with attaching means (not shown), and the power receiving connector 3 is fixed to the charging port 2a via the main body 3f. This causes the power receiving connector 3 to have its part on the front side of the flange 3e exposed to the inside of the charging port 2a, and its part on the rear side of the flange 3e accommodated in the vehicle body 2.

The shapes of the front wall 3g and the side walls 3h, 3i follow the shape of the front portion of the actuator 10, to have gaps S between the front wall 3g and the respective side walls 3h, 3i. The front wall 3g is a rectangular plate member formed so as to extend upward from the protective cover 3b at a position anterior to the main body 3f. The front wall 3g is formed in parallel to the main body 3f. The side wall 3h is a rectangular plate member formed so as to extend obliquely frontward and rightward from one end of the main body 3f, and the side wall 3i is a rectangular plate member formed so as to extend obliquely frontward and leftward from the other end of the main body 3f.

An upper surface 3l of the protective cover 3b, on the rear side of the front wall 3g, is lower than an upper surface of the protective cover 3b, on the front side of the front wall 3g. The upper surface 3l is formed therein with an insertion hole 3k which leads to the gap 3c. Plugging the charging connector 4 into the power receiving connector 3 causes the insertion hole 3k of the power receiving connector 3 to communicate with the fitting hole 4c of the charging connector 4. The lock pin 52 protruding downward from the actuator 10 is inserted into the insertion hole 3k, in a state that the charging connector 4 is attached to the power receiving connector 3.

The power receiving connector 3 is formed, on its upper surface posterior to the flange 3e, with seatings 3s, 3t, 3u on which the actuator 10 is mounted. The seatings 3s, 3t are formed with threaded holes in the vertical direction, and the seating 3u is formed with a threaded hole in the right-left direction. Screws 6 are used to fix the actuator 10 to the seatings 3s, 3t, 3u.

The locking mechanism 5 in FIG. 2 includes an actuator 10 arranged above the power receiving connector 3, and the fitting hole 4c formed in the charging connector 4. The lock pin 52 protruding downward from the actuator 10 is fitted into the fitting hole 4c. The actuator 10 is a device for preventing the charging connector 4 from coming off in a state that the charging connector 4 is attached to the power receiving connector 3. The actuator 10 mainly includes a housing 11 that is a box made of resin, and a driving mechanism 12 (see FIG. 3) that is housed in the housing 11.

As shown in FIG. 2, the housing 11 is formed, on its right and left side surfaces, with a pair of supporters 13 protruding rightward and leftward, and, on the lower surface on the right side of the housing 11, with a supporter 14 protruding downward. The supporters 13, 14 are used to attach the actuator 10 to the upper portion of the power receiving connector 3 (see FIG. 1), so as to be fixed to the seatings 3s, 3t, 3u of the power receiving connector 3, respectively, by the screws 6.

Figure 3:
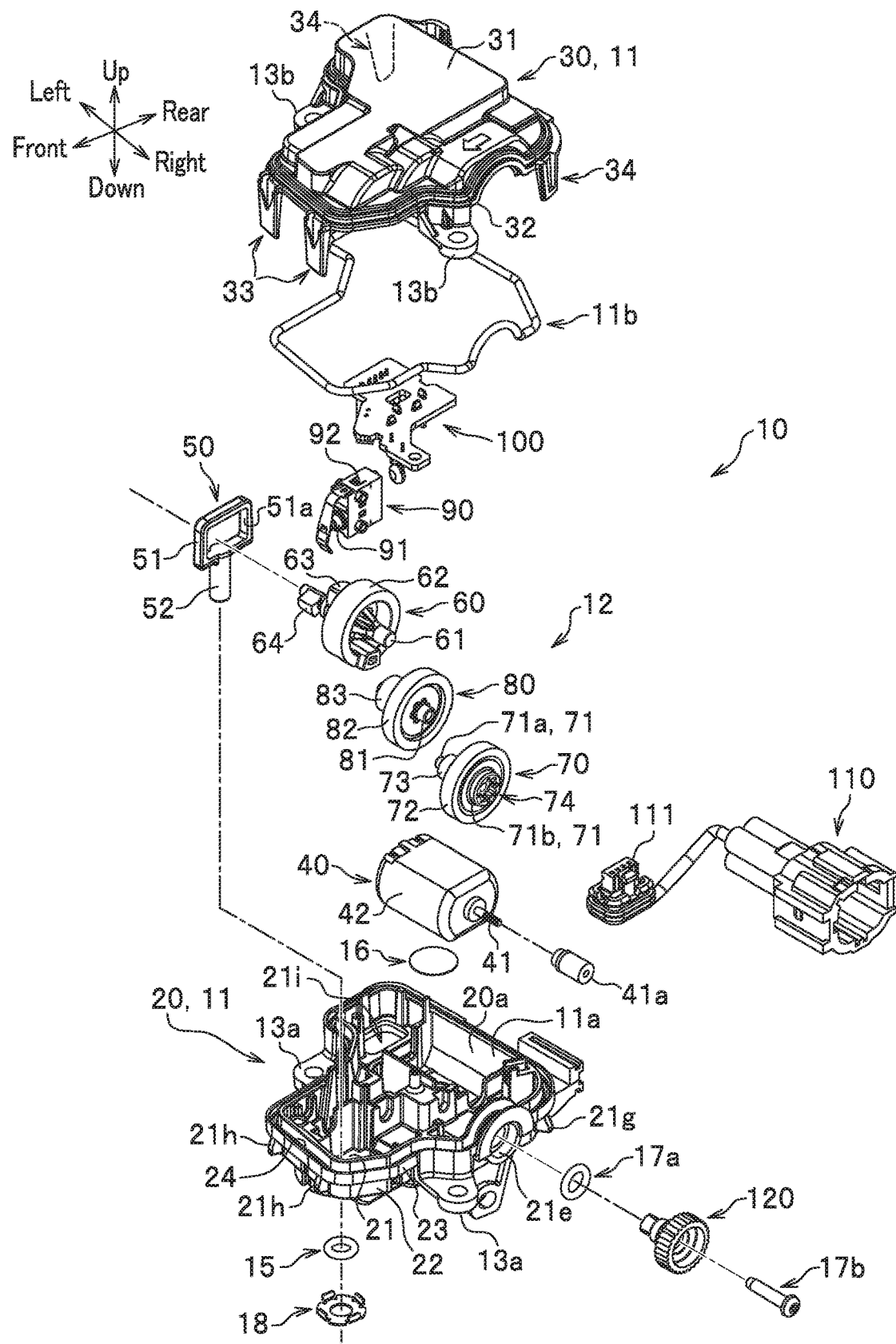
FIG. 3 is an exploded perspective view of an actuator according to the embodiment.

As shown in FIG. 3, the housing 11 mainly includes a lower housing 20 having a space inside, and an upper housing 30 for closing an opening 20a of the lower housing 20. Combining the lower housing 20 and the upper housing 30 defines a housing space 11a in the housing 11. The driving mechanism 12 is housed in the housing space 11a.

The lower housing 20 is a box-like member having the opening 20a formed on its upper surface, and mainly includes a bottom 21 in a flat plate shape and a peripheral wall 22 that stands on the outer peripheral edge of the bottom 21. The peripheral wall 22 is a frame that surrounds the housing space 11a. An opening edge 23, which is an upper end edge of the peripheral wall 22, protrudes outward beyond the outer surface of the peripheral wall 22 so as to have a flange shape, and an upper surface of the opening edge 23 is formed with a seal groove 24 along the entire circumference. An adhesive 11b such as a hot melt is applied to the seal groove 24. The adhesive 11b bonds the lower housing 20 with the upper housing 30 and prevents foreign matter from entering into the housing space 11 from outside.

Figure 4:
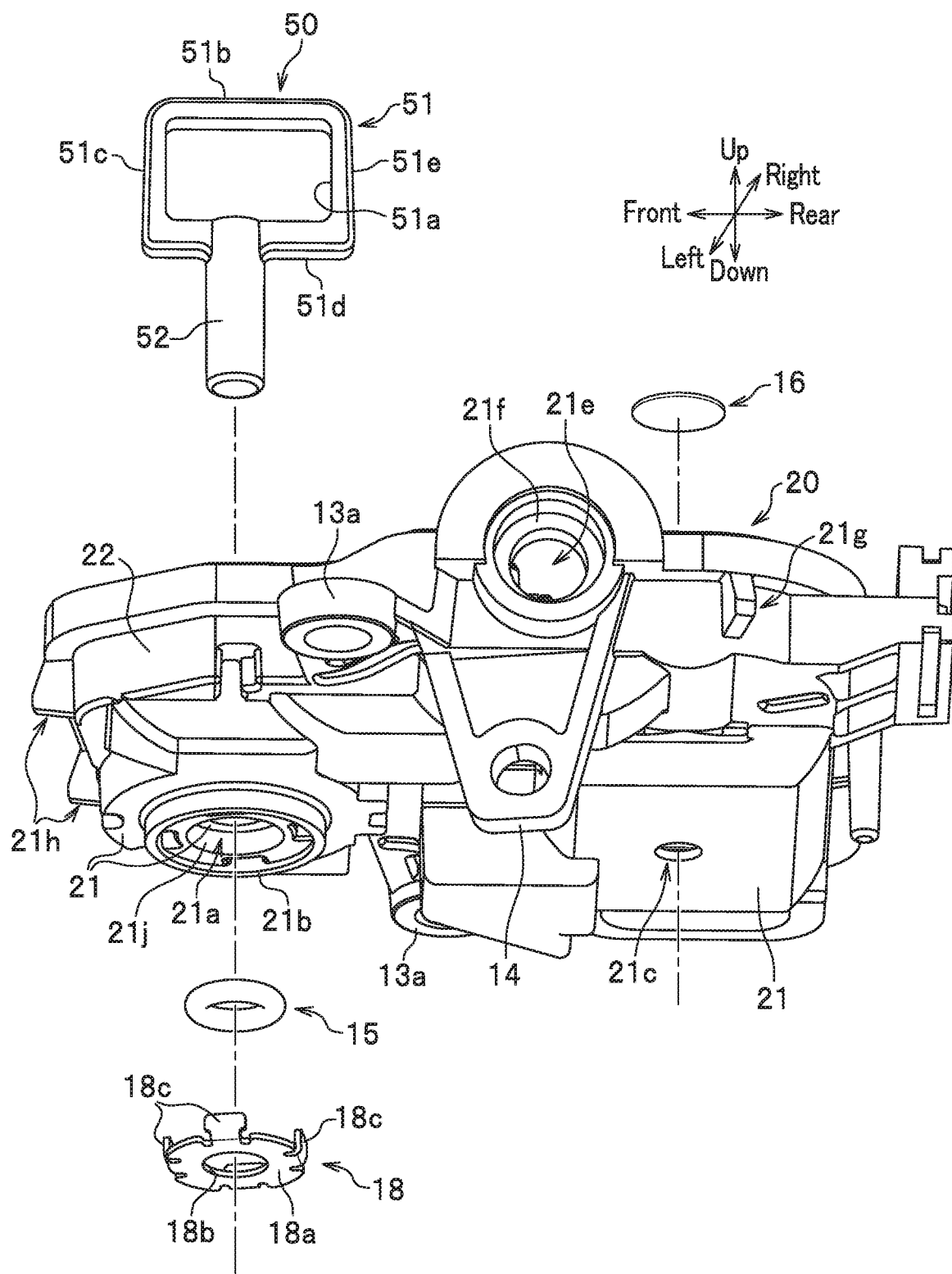
FIG. 4 is a diagram illustrating a lower housing of the actuator according to the embodiment, as viewed obliquely from below.

As shown in FIG. 4, the lower housing 20 is formed, on its right and left side surfaces, with a pair of protrusions 13a protruding outward from the peripheral wall 22. The pair of protrusions 13a constitutes the supporters 13 (see FIG. 2) for attaching the actuator 10 to the power receiving connector 3 (see FIG. 1).

The bottom 21 of the lower housing 20 is formed, on its front side, with an insertion hole 21a through which the lock pin 52 of a separation restricting member 50 is inserted. A peripheral edge 21b of the insertion hole 21a protrudes downward beyond other portions of the insertion hole 21a, so as to have an O-ring 15 attached thereto using an O-ring attachment 18. The O-ring 15 is attached to a stepped part defined by the bottom 21 and an inner peripheral surface 21j. The O-ring attachment 18 is made of metal and includes: a main plate body 18a that has a through hole 18b and is formed in a ring shape; and four risings 18c that rise from the outer edge of the main plate body 18a. The risings 18c are engaged with recesses formed in the peripheral edge 21b to cause the O-ring attachment 18 to fix the O-ring 15 to the bottom 21 of the lower housing 20.

The bottom 21 of the lower housing 20 is formed, on its rear side, with a circular air hole 21c. The air hole 21c is formed at a position beneath an electric motor 40 (see FIG. 3), to communicate the inside of the housing 11 with the outside thereof. The air hole 21c is covered from the inside by a moisture permeable waterproof material (or filter) 16 in a circular shape. The moisture permeable waterproof material 16 is made of a material which allows air to enter and exit but prevents water from entering and exiting, to prevent water and dust from entering the air hole 21c from the external space. The moisture permeable waterproof material 16 is formed to have a larger diameter than the air hole 21c. The moisture permeable waterproof material 16 is adhered to the inner surface of the bottom 21 by an adhesive means such as a double-faced tape. Note that in the present embodiment, the position where the air hole 21c is formed is determined so that grease (lubricant) used in the driving mechanism 12 does not scatter to the moisture permeable waterproof material 16 and the air hole 21c. Details of the position where the air hole 21c is formed will be described later.

The lower housing 20 is formed, on its upper right side-surface, with an insertion hole 21e through which a dial 120 (see FIG. 3) is inserted. The insertion hole 21e is provided with a recess 21f defined by part of a cylindrical wall further back from the rest, so that an O-ring 17a (see FIG. 3) and the dial 120 are attached to the recess 21f using a dial fixing member 17b. The dial fixing member 17b has its front end engaged with a transmission member 70 (see FIG. 3) to fix the dial 120 to the transmission member 70.

As shown in FIG. 4, the lower housing 20 is formed, at the rear of its right side-surface, with an engaging protrusion 21g to be engaged with the upper housing 30. Although not shown, the engaging protrusion 21g is similarly formed at the rear of the left side-surface of the lower housing 20. In addition, the lower housing 20 is formed, on its front surface, with a pair of engaging protrusions 21h to be engaged with the upper housing 30. The engaging protrusions 21g, 21h are engaged with the upper housing 30.

As shown in FIG. 3, the upper housing 30 is a lid member for closing the opening 20a of the lower housing 20. The upper housing 30 has a ceiling 31 in a flat plate shape, and an outer peripheral edge 32 of the ceiling 31 is formed to have the same shape as that of the outer peripheral of the opening edge 23 of the lower housing 20. The outer peripheral edge 32 of the ceiling portion 31 is engaged with the opening edge 23 of the lower housing 20 and is bonded to the opening edge 23 by the adhesive 11b. At this time, the adhesive 11b arranged along the opening edge 23 of the lower housing 20 liquid-tightly seals a gap between the lower housing 20 and the upper housing 30.

The upper housing 30 is formed, on its right and left, with a pair of protrusions 13b protruding outward from the outer peripheral edge 32 of the ceiling 31. The pair of protrusions 13b constitutes the supporters 13 (see FIG. 2) for attaching the actuator 10 to the power receiving connector 3 (see FIG. 1). In addition, the upper housing 30 is formed, on its front surface, with a pair of front claws 33 extending downward from the outer peripheral edge 32 of the ceiling 31. Further, the upper housing 30 is formed, on its right and left rear sides, with a pair of rear claws 34 extending downward from the outer peripheral edge 32 of the ceiling 31. The rear claws 34 engage with the engagement protrusions 21g and the front claws 33 engage with the engagement protrusions 21h to integrally couple the lower housing 20 and the upper housing 30. Furthermore, releasing such engagement allows for separating the lower housing 20 from the upper housing 30.

Figure 5:
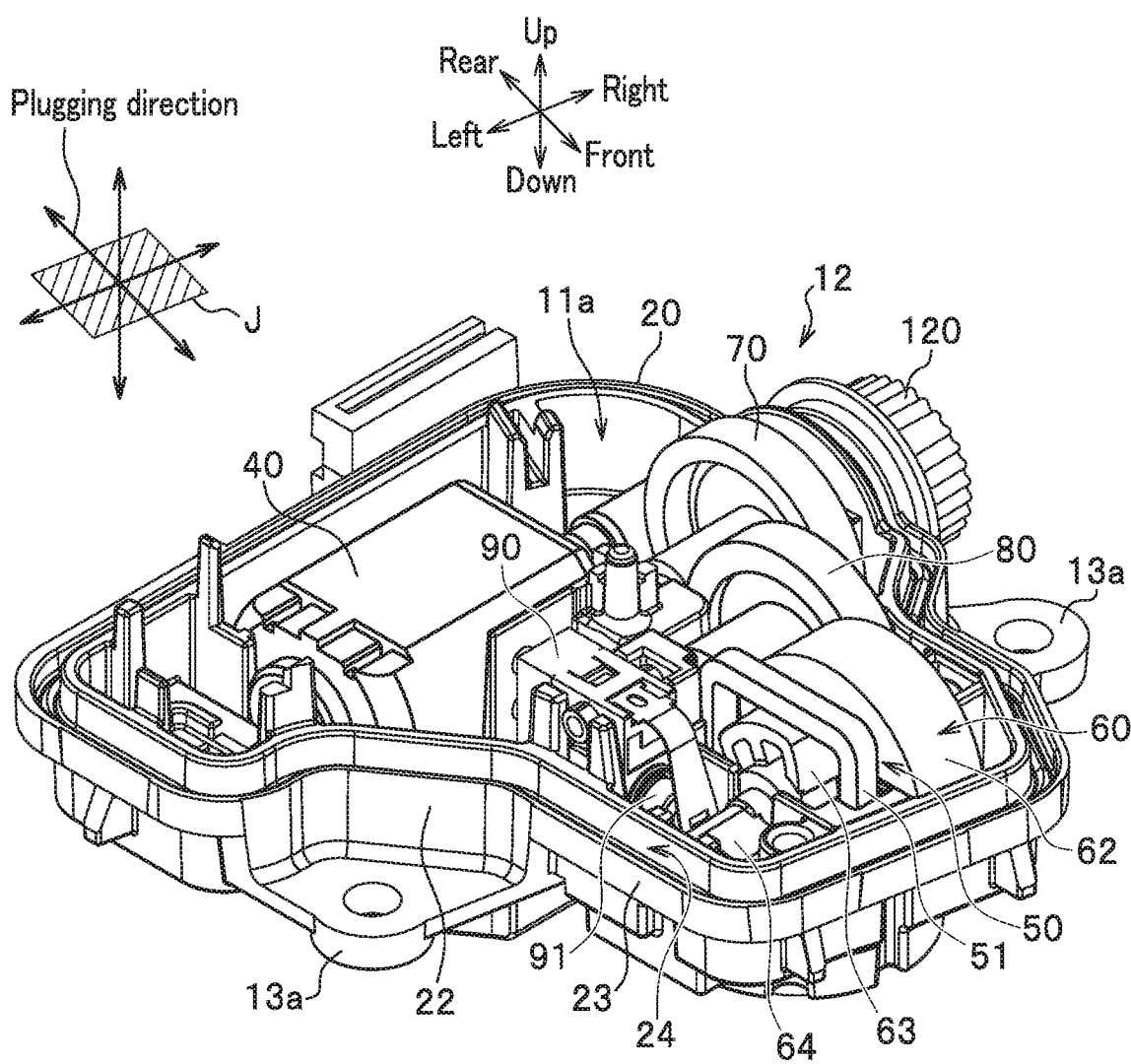
FIG. 5 is a perspective view of the inside of the actuator according to the embodiment.
Figure 6:
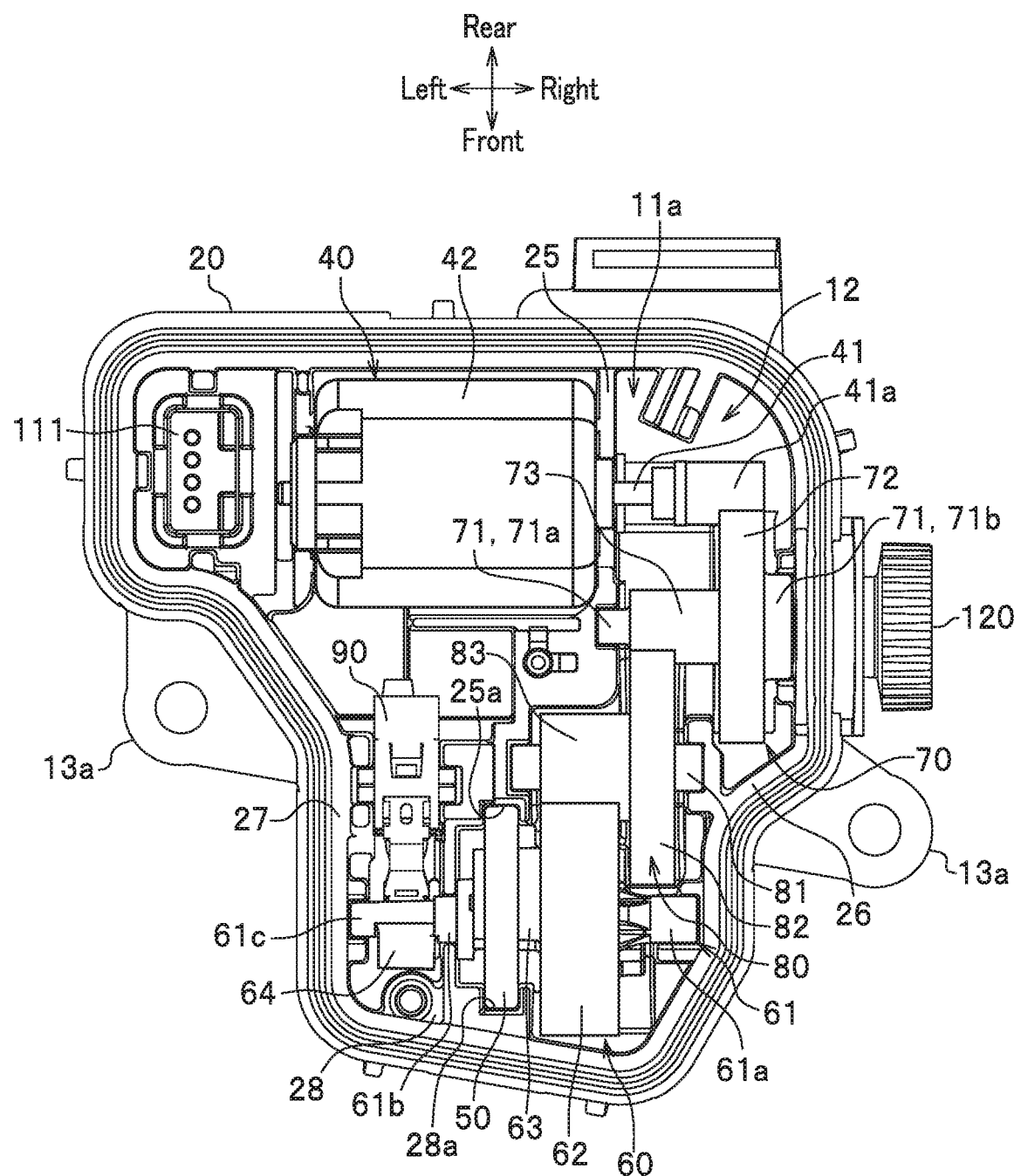
FIG. 6 is a plan view of the inside of the actuator according to the embodiment.

The driving mechanism 12 will be described with reference to FIG. 3. The driving mechanism 12 mainly includes the electric motor 40, the separation restricting member 50, a cam member 60, and the transmission members 70, 80. The separation restricting member 50 is a member that moves up and down by the driving force of the electric motor 40. The cam member 60 has a cam gear 62 having a first cam 63 protruding therefrom. The transmission members 70, 80 are interposed between an output shaft 41 of the electric motor 40 and the cam gear 62. In addition, the driving mechanism 12 further includes a sensor 90, a substrate 100, a power supply unit 110, and the dial 120. The sensor 90 is a device that detects a position of the separation restricting member 50. The substrate 100 has the electric motor 40 and the sensor 90 electrically connected thereto. The power supply unit 110 is electrically connected to a control device (not shown) mounted on the vehicle 1 (see FIG. 1), and supplies power to the substrate 100. The dial 120 is a member for manually driving the separation restricting member 50. As shown in FIGS. 5 and 6, the driving mechanism 12 is housed in the housing space 11a in the lower housing 20.

As shown in FIG. 6, the electric motor 40 has a motor housing 42, and the output shaft 41 protrudes rightward from the motor housing 42. The output shaft 41 has a cylindrical gear 41a circumferentially inserted thereon. The electric motor 40 is arranged at the center in the rear part of the housing space 11a of the housing 11.

The transmission member 70 is a two-stage gear and includes a rotation shaft 71 whose axial direction is arranged in the right-left direction, a first gear 72 having a rotation shaft 71 as its central axis, and a second gear 73 having the rotation shaft 71 as its central axis. The second gear 73 has a smaller diameter than the first gear 72. The rotation shaft 71 of the first gear 72 (hereinafter, sometimes referred to as a "rotation shaft 71b") has a larger diameter than the rotation shaft 71 of the second gear 73 (hereinafter, sometimes referred to as a "rotation shaft 71a"), and has an engaging concave 74 (see FIG. 3) formed therein.

The transmission member 70 is arranged on the right side of the motor housing 42 in the housing space 11a. The rotation shaft 71a is rotatably supported by a central wall 25 formed longitudinally in the front-rear direction in the lower housing 20, and the rotation shaft 71b is rotatably supported by a right wall 26 of the lower housing 20. A space on the right side of the central wall 25 is filled with grease, while a space on the left side of the central wall 25 is not filled with grease. That is, the central wall 25 serves as a grease-scattering prevention wall that prevents grease from entering the space where the electric motor 40 is arranged. The first gear 72 meshes with the gear 41a of the electric motor 40, while the second gear 73 meshes with a third gear 82 of the transmission member 80.

As shown in FIG. 3, the transmission member 80 is a two-stage gear and includes a rotation shaft 81 whose axial direction is arranged in the right-left direction, the third gear 82 having the rotation shaft 81 as its central axis, and a fourth gear 83 having the rotation shaft 81 as its central axis. The fourth gear 83 has a smaller diameter than the third gear 82.

As shown in FIG. 6, the transmission member 80 is arranged in the housing space 11a, between the transmission member 70 and the cam member 60. The left end of the rotation shaft 81 is rotatably supported by the central wall 25 formed in the lower housing 20 and the right end of the rotation shaft 81 is rotatably supported by the right wall 26 of the lower housing 20. The third gear 82 meshes with the second gear 73 of the transmission member 70, and the fourth gear 83 meshes with the cam gear 62 of the cam member 60.

The cam member 60 in FIG. 3 is a member for vertically moving the separation restricting member 50. The cam member 60 includes a rotation shaft 61 whose axial direction is arranged in the right-left direction, the cam gear 62 that is a spur gear having the rotation shaft 61 as its central axis, the first cam 63, and a second cam 64. The first cam 63 protrudes from the left side-surface of the cam gear 62 and is eccentric with respect to the rotation center of the cam gear 62. The second cam 64 is formed closer to the front end (left side) than the first cam 63, and is eccentric with respect to the rotation center of the cam gear 62. The cam member 60 may be formed by joining individual members, but is integrally formed in the present embodiment.

As shown in FIG. 6, the cam member 60 is arranged in a front part of the housing space 11a. A right end 61a of the rotation shaft 61 of the cam member 60 is rotatably supported by the right wall 26 inside the lower housing 20 and the central part 61b of the rotation shaft 61 is rotatably supported by the central wall 25 formed in the lower housing 20. Note that a left end 61c of the rotation shaft 61 is not supported by a left wall 27 inside the lower housing 20 to have a gap between the left end 61c and the left wall 27.

Figure 7:
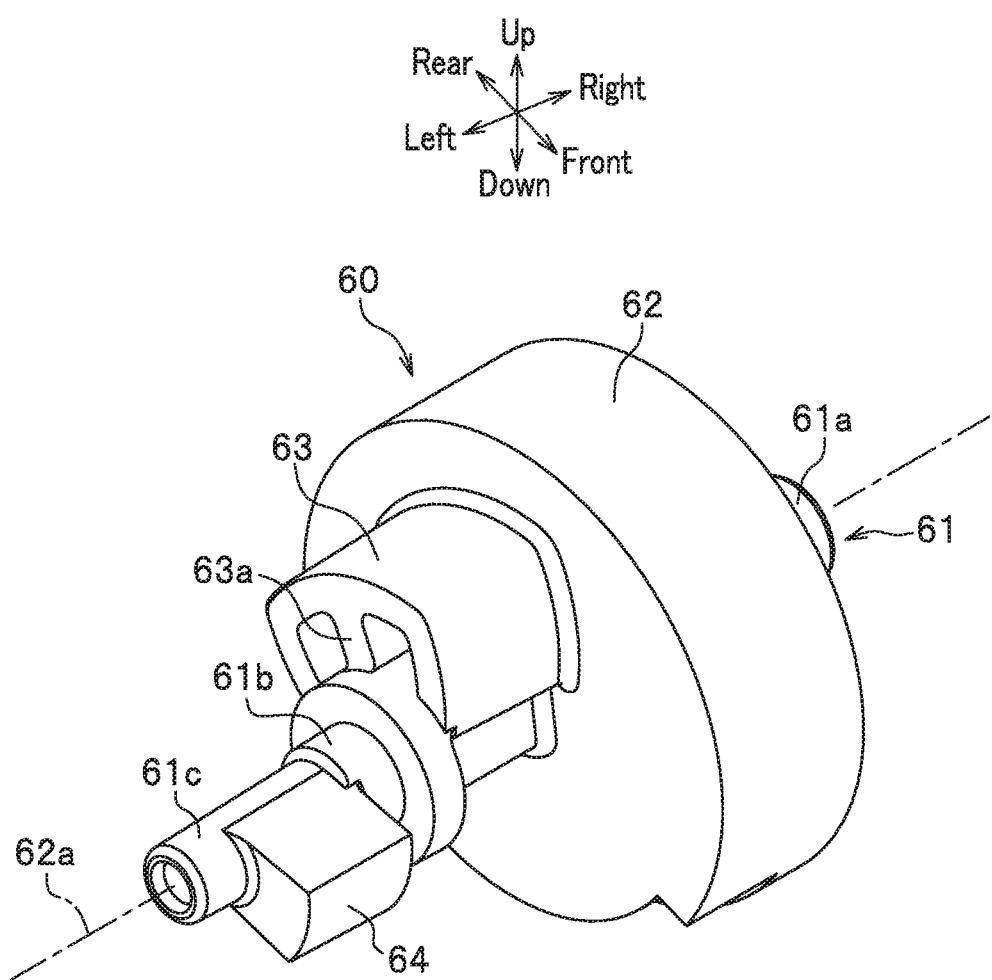
FIG. 7 is a perspective view of a cam member.

As shown in FIG. 7, the cam gear 62 is formed with teeth on the outer peripheral surface except a bottom part thereof. The first cam 63 is a part that comes into contact with the separation restricting member 50 (see FIG. 3), and protrudes from the left side-surface of the cam gear 62. The first cam 63 is formed to have an outer periphery in a substantially triangular shape in a side view, and one of three corners of the first cam 63 and its vicinity is arranged on the rotation center of the cam gear 62. That is, a center 63a of the first cam 63 is eccentric with respect to the rotation center 62a of the cam gear 62. The first cam 63 is arranged in a cam receiving frame 51 of the separation restricting member 50 in FIG. 5. For the cam member 60, the rotation angle of the cam gear 62 is set so that the first cam 63 is rotated clockwise and counterclockwise about the rotation center of the cam gear 62 in a range less than one rotation. The second cam 64 is formed to protrude radially outward from, and be eccentric with respect to, the rotating shaft 61. The second cam 64 is a part detected by a switch 91 of the sensor 90 in FIG. 5.

As shown in FIGS. 5 and 6, in the present embodiment, the rotation shaft 61 of the cam member 60, the rotation shaft 71a of the transmission member 70, and the rotation shaft 81 of the transmission member 80 are all arranged in a single plane J (here, in the horizontal plane) and are arranged in parallel to one another in the right-left direction. Additionally, as shown in FIG. 2, these shafts are arranged substantially perpendicular to a reference plane K defined by a line segment running in the direction of plugging the charging connector 4 (here, front to rear) and a line segment extending from the housing 11 toward the power receiving connector 3 (here, up to down). Here, the wording "substantially perpendicular to the reference plane K" is intended to allow a certain deviation in arranging the axis perpendicular to the reference plane K, such as arranging the respective rotation shafts (in the actuator 10) in a state that the plane J is inclined at a predetermined angle (within 30 degrees, for example) to the horizontal plane.

The separation restricting member 50 in FIG. 3 is a member that prevents the charging connector 4 from coming off in a state that the charging connector 4 is attached to the power receiving connector 3. The separation restricting member 50 is arranged in a front part of the housing space 11a. The separation restricting member 50 is made of resin and has the cam receiving frame 51 having an opening 51a which is open in the right-left direction, and the lock pin 52 integrally formed with the cam receiving frame 51.

As shown in FIG. 4, the cam receiving frame 51 is an endless member constituting a frame of the opening 51a having a rectangular shape in side view and includes an upper side 51b, a front side 51c, a bottom side 51d, and a rear side 51e. As shown in FIG. 5, the cam receiving frame 51 has the rotation shaft 61 of the cam member 60 inserted thereinto, and has the first cam 63 inserted thereinto from the right side of the opening 51a. The inner sides of the upper side 51*b* and bottom side 51*d* of the cam receiving frame 51 are cam receiving surfaces on which a cam surface of the first cam 63 abuts.

As shown in FIG. 6, the central wall 25 and front wall 28 of the lower housing 20 are formed to have a pair of guide grooves 25*a*, 28*a* extending vertically. In a state that the front side 51*c* is housed in the guide groove 28*a* and the rear side 51*e* is housed in the guide groove 25*a*, the separation restricting member 50 is vertically movable along the guide grooves 25*a*, 28*a*. The cam surface of the first cam 63 abuts on the inside of the upper side 51*b* of the cam receiving frame 51 to lift the separation restricting member 50. Hereinafter, a state that the separation restricting member 50 is lifted is referred to as an "initial state," and a position of the separation restricting member 50 in the initial state is referred to as an "initial position." Also, the cam surface of the first cam 63 abuts on the inside of the bottom side 51*d* of the cam receiving frame 51 to depress the separation restricting member 50. Hereinafter, a state that the separation restricting member 50 is depressed is referred to as a "restricting state," and a position of the separation restricting member 50 in the restricting state is referred to as a "restricting position."

As shown in FIG. 4, the lock pin 52 is a shaft member having a circular cross section, and is formed so as to extend downward from the bottom side 51*d* of the cam receiving frame 51. The lock pin 52 is arranged to have the axis running in the vertical direction, and the front end of the lock pin 52 is chamfered. At the initial position, the front end of the lock pin 52 is moved inward of the housing 11 to allow the charging connector 4 to be detached. In contrast, at the restricting position, the front end of the lock pin 52 protrudes outward from the insertion hole 21*a* formed in the lower housing 20 (i.e., protrudes downward below the lower housing 20). At the restricting position, the lock pin 52 is fitted into the fitting hole 4*c* formed in the charging connector 4 through the insertion hole 3*k* formed in the power receiving connector 3, as shown in FIG. 1. This restricts the charging connector 4 from coming off the power receiving connector 3.

The sensor 90 shown in FIG. 3 detects the position of the lock pin 52 and includes the switch 91 that is pressed by the second cam 64 of the cam member 60, and a main body 92 that outputs a state of the switch 91 to the control device as a detection signal or a release signal.

The substrate 100 in FIG. 3 controls driving the electric motor 40 and the sensor 90, and is electrically connected to the electric motor 40, the switch 91, and the power supply unit 110. The substrate 100 is arranged in the left rear part of the housing space 11*a*.

The power supply unit 110 in FIG. 3 supplies electric power to the substrate 100, and has a male connector 111. The male connector 111 is fitted from below into a fitting hole 21*i* formed in a left rear part of the lower housing 20 so as to be connected to a female connector (not shown) of the substrate 100.

The dial 120 in FIG. 3 is attached to the engaging concave 74 of the transmission member 70 by using the dial fixing member 17*b*. The dial 120 is rotated to vertically move the separation restricting member 50 without a driving force of the electric motor 40. For example, if the electric motor 40 fails for some reason, the dial 120 is rotated to move the separation restricting member 50 from the restricting position to the initial position.

Figure 10:
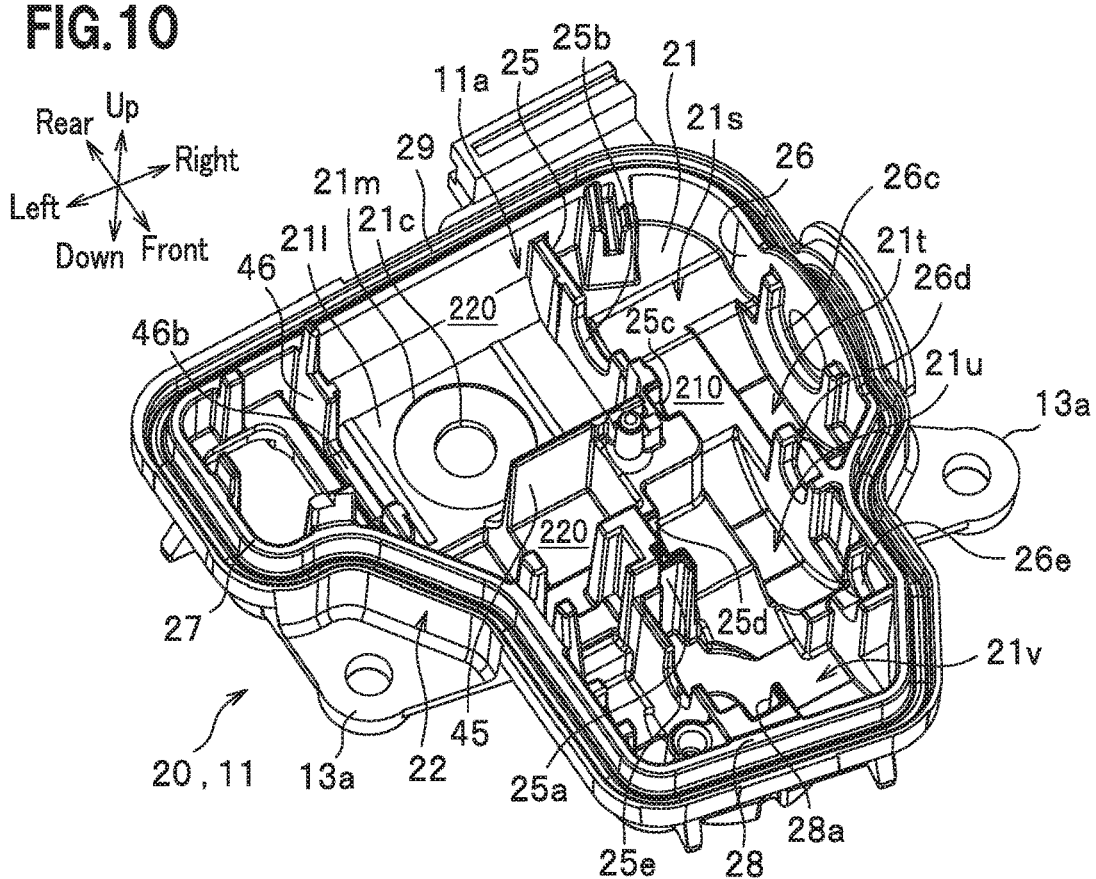
FIG. 10 is a perspective view of the lower housing of the actuator according to the embodiment, as viewed obliquely from above.
Figure 11:
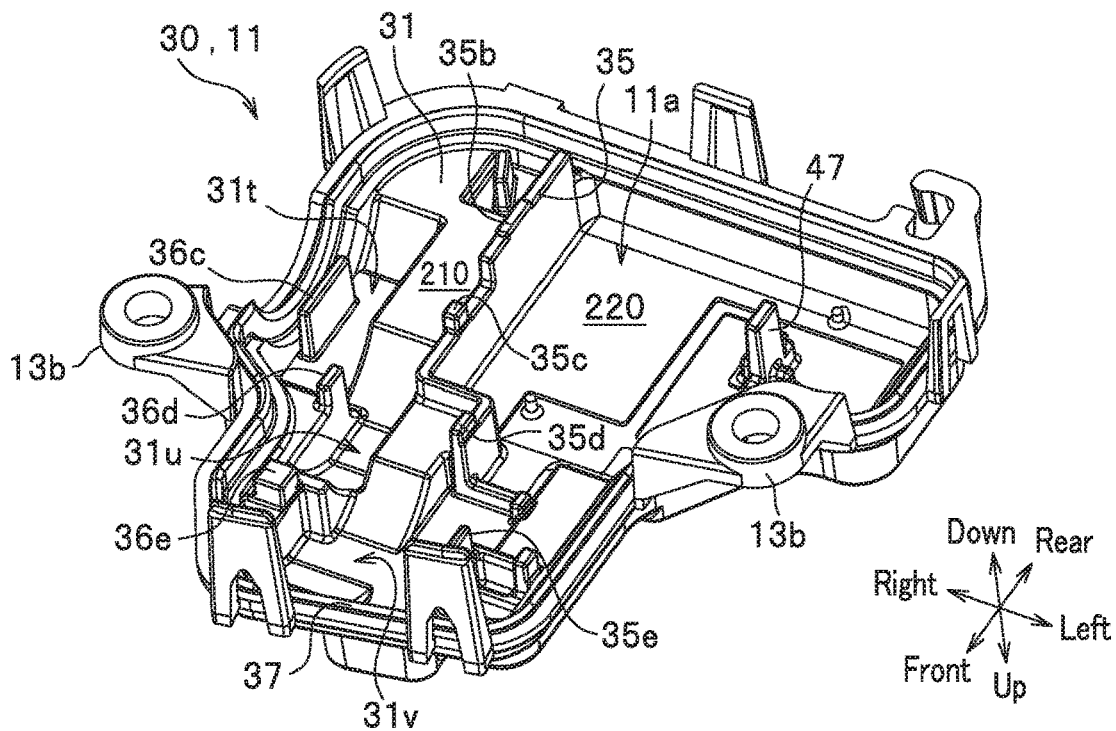
FIG. 11 is a perspective view of the upper housing of the actuator according to the embodiment, as viewed obliquely from below.

Next, a description will be given in more detail of surroundings of the transmission members 70, 80 and cam member 60, with reference to FIGS. 10 and 11 (see FIGS. 3 and 6 as appropriate). As shown in FIG. 10, the peripheral wall 22 of the lower housing 20 mainly includes the right wall 26, the left wall 27, a front wall 28, a rear wall 29, and the central wall 25 that is formed to run in the front-rear direction within the lower housing 20. The central wall 25 is mainly formed with a receiving part 25*b*, bearing parts 25*c*, 25*d*, 25*e*, and a guide groove 25*a*. In addition, as shown in FIG. 11, the upper housing 30 is formed, on its inner surface, with an extending-downward wall 35 so as to meet the central wall 25 of the lower housing 20. The extending-downward wall 35 is formed to stand on the inner surface of the upper housing 30. The extending-downward wall 35 is mainly formed with projections 35*b*, 35*c*, 35*d*, 35*e*.

In a state that the upper housing 30 is assembled to the lower housing 20, the upper end of the central wall 25 abuts against the lower end of the extending-downward wall 35 to divide the housing space 11*a* in the housing 11 into a right space 210 and a left space 220. The right space 210 serves as a gear box in which the transmission member 70 and the like are arranged, and is filled with grease. The left space 220 is arranged with the electric motor 40, the sensor 90, and the like, and is not filled with grease. That is, the central wall 25 and the extending-downward wall 35 serve as a grease-scattering prevention wall that prevents grease from entering the left space 220.

Specifically, as shown in FIG. 10, the central wall 25 of the lower housing 20 is formed with the receiving part 25*b* that receives the output shaft 41 of the electric motor 40. In addition, the bottom 21 of the lower housing 20 is formed with a recessed part 21*s* that is recessed so as to follow the gear 41*a* of the electric motor 40. Further, as shown in FIG. 11, the extending-downward wall 35 of the upper housing 30 is formed with the projection 35*b* that is arranged at a position opposite to the receiving part 25*b* to press an edge of the electric motor 40.

As shown in FIG. 10, the central wall 25 of the lower housing 20 is formed with the bearing part 25*c* that receives the rotation shaft 71*a* of the transmission member 70, and the right wall 26 is formed with a bearing 26*c* that receives the rotation shaft 71*b* of the transmission member 70. In addition, the bottom 21 of the lower housing 20 is formed with a recessed part 21*t* which is recessed to follow the first gear 72 of the transmission member 70. Further, as shown in FIG. 11, the extending-downward wall 35 of the upper housing 30 is formed with the projection 35*c* which causes the bearing part 25*c* to receive therein the rotation shaft 71*a* of the transmission member 70. Furthermore, the ceiling 31 of the upper housing 30 is formed with a projection 36*c* which causes the bearing part 26*c* to receive therein the rotation shaft 71*b*. The ceiling 31 is also formed with a recessed part 31*t* which is recessed to follow the first gear 72 of the transmission member 70.

As shown in FIG. 10, the central wall 25 of the lower housing 20 is formed with the bearing part 25*d* that receives the rotation shaft 81 of the transmission member 80, and the right wall 26 is formed with a bearing part 26*d* that receives the rotation shaft 81 of the transmission member 80. In addition, the bottom 21 of the lower housing 20 is formed with a recessed part 21*u* which is recessed to follow the third gear 82 of the transmission member 80. Further, as shown in FIG. 11, the extending-downward wall 35 of the upper housing 30 is formed with the projection 35*d* which causes the bearing part 25*d* to receive therein the rotation shaft 81 of the transmission member 80. Furthermore, the ceiling 31 of the upper housing 30 is formed with a projection 36*d* which causes the bearing part 26*d* to receive therein the rotation shaft 81. The ceiling 31 is also formed with a recessed part 31*u* which is recessed to follow the third gear 82 of the transmission member 80.

As shown in FIG. 10, the center wall 25 and front wall 28 of the lower housing 20 are formed to have the pair of guide grooves 25*a*, 28*a* which guide the cam receiving frame 51 of the separation restricting member 50. In addition, the central wall 25 of the lower housing 20 is formed with the bearing 25*e* that receives the rotation shaft 61 of the cam member 60, and the right wall 26 is formed with a bearing part 26*e* that receives the rotation shaft 61. Further, the bottom 21 of the lower housing 20 is formed with a recessed part 21*v* which is recessed to follow the cam gear 62 of the cam member 60. Furthermore, as shown in FIG. 11, the ceiling 31 of the upper housing 30 is formed with projections 35*e*, 36*e* which cause the bearing parts 25*e*, 26*e* to receive therein the rotation shaft 61 of the cam member 60. The ceiling 31 is also formed with a recessed part 31*v* which is recessed to follow the cam gear 62 of the cam member 60.

Next, a description will be given more in detail of surroundings of the electric motor 40, with reference to FIGS. 10 to 13 (see FIGS. 3 and 6 as appropriate). The motor housing 42 of the electric motor 40 is isolated from other components of the driving mechanism 12 in a state that the electric motor 40 is assembled to the housing 11. That is, the housing 11 has a structure of isolating the motor housing 42 from other components of the driving mechanism 12 (a "motor box" in claims).

Specifically, the motor housing 42 is surrounded, on its front, rear, right, and left sides, by the rear wall 29, the central wall 25, a front partition wall 45 and a left partition wall 46 of the lower housing 20 in FIG. 10, as well as the extending-downward wall 35 and a left partition wall 47 of the upper housing 30 in FIG. 11. These members surrounding the front, rear, right and left sides of the motor housing 42 are "peripheral walls" in one or more claims. In addition, the motor housing 42 is covered, at its top, by the ceiling 31 of the upper housing 30, and is covered, at its bottom, by the bottom 21 of the lower housing 20.

The front partition wall 45 of the lower housing 20 is a rectangular plate member formed to extend upward from the bottom 21 to isolate the electric motor 40 from the sensor 90. The left partition wall 46 of the lower housing 20 is a member formed to extend upward from the bottom 21, and includes a recess 46*b* that is formed to follow the shape of the motor housing 42 of the electric motor 40. The left partition wall 46 separates the electric motor 40 from the male connector 111. The left partition wall 47 of the upper housing 30 is a member formed to extend downward from the ceiling 31 to abut on the motor housing 42 of the electric motor 40 so as to cause the recess 46*b* of the left partition wall 46 to receive the electric motor 40.

Figure 12:
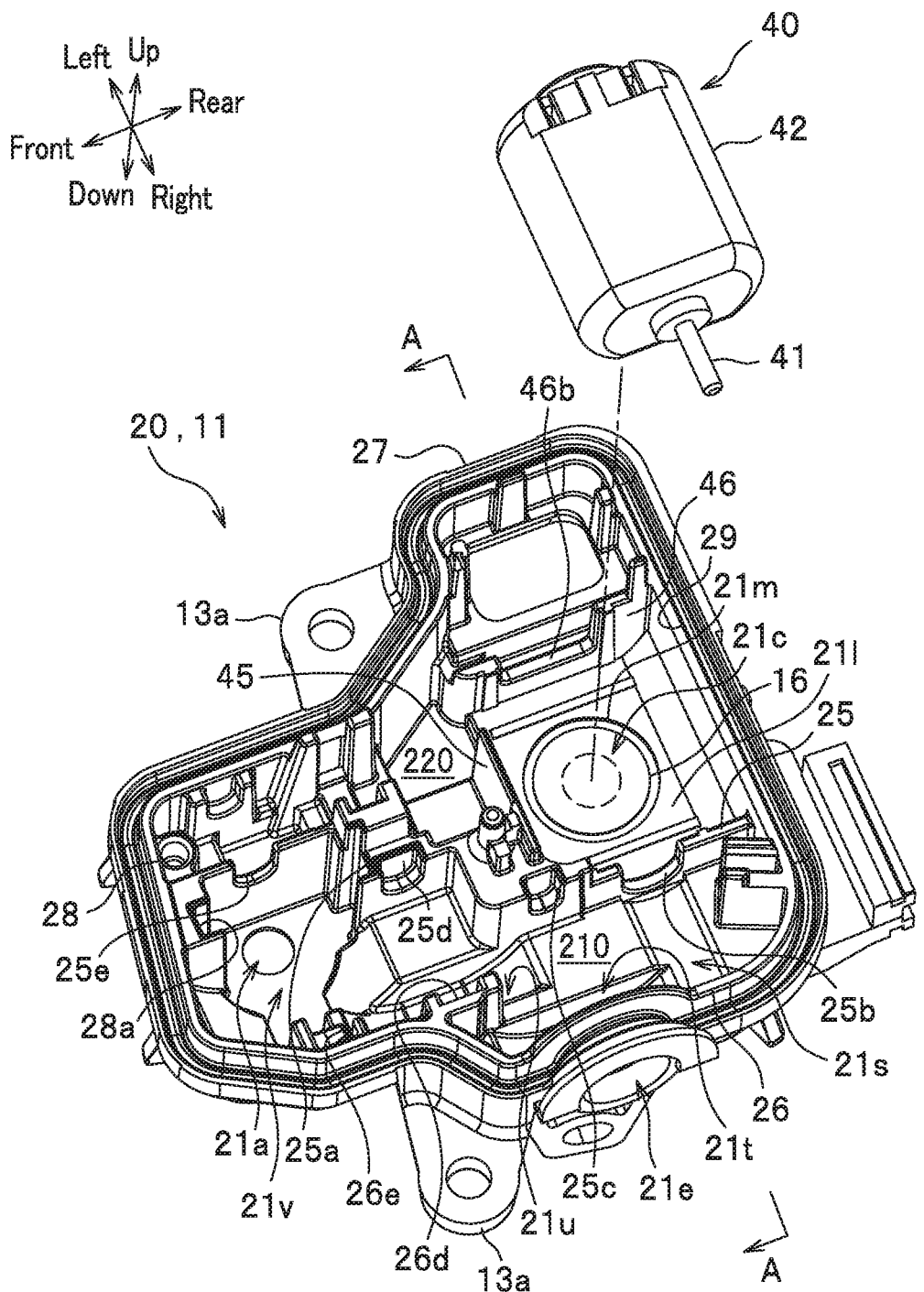
FIG. 12 is a perspective view of the lower housing (in a state that a moisture permeable waterproof material is attached) of the actuator according to the embodiment, as viewed obliquely from above.
Figure 13:
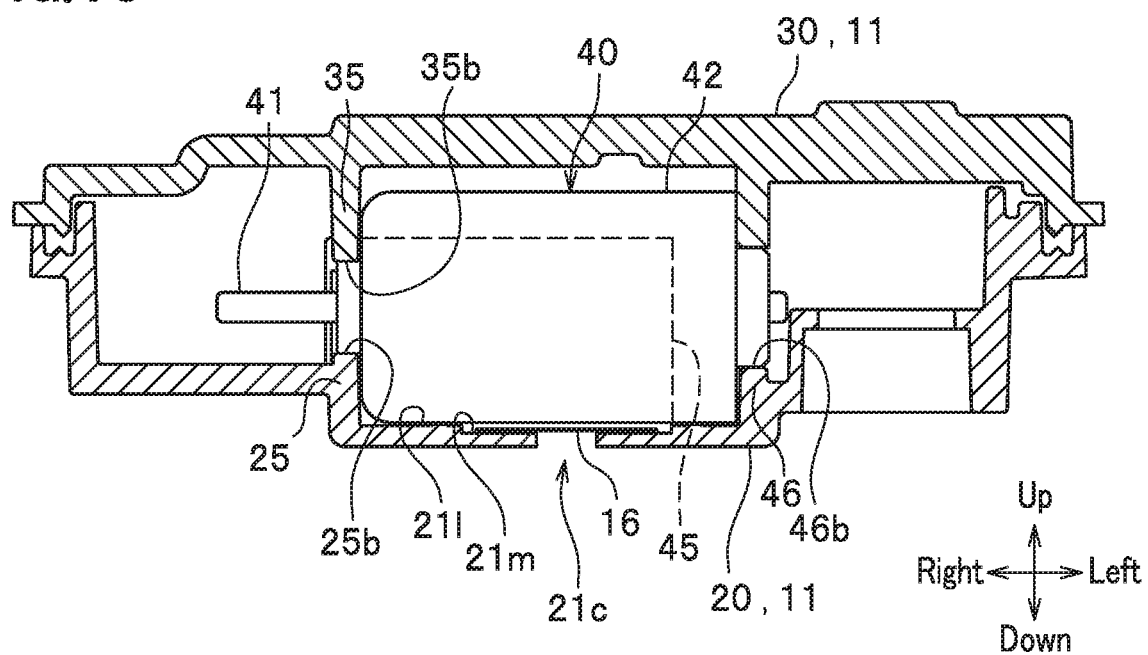
FIG. 13 is a schematic sectional view, taken along a line A-A in FIG. 12, of the upper housing being assembled to the lower housing.

As shown in FIG. 12, a bottom 21*l*, on which the electric motor 40 is arranged, is formed therein with a recess 21*m* having a circular shape in a plan view. The recess 21*m* is formed, in its center, with the air hole 21*c* in a circular shape that communicates the inside of the housing 11 with the outside. The air hole 21*c* prevents air pressure in the housing 11 from increasing due to heat generated by the electric motor 40 and the substrate 100 (see FIG. 3). The air hole 21*c* is covered from the inside by the moisture permeable waterproof material 16 in a circular shape. The moisture permeable waterproof material 16 is made of a material which allows air to enter and exit but prevents water from entering and exiting, to prevent water and dust from entering the air hole 21*c* from the external space. The moisture permeable waterproof material 16 has a size and a thickness to be fitted in the recess 21*m*, and, as shown in FIG. 13, there is a gap between the electric motor 40 and the moisture permeable waterproof material 16 in a state that the electric motor 40 is assembled to the housing 11. The moisture permeable waterproof material 16 is adhered in the recess 21*m* by an adhesive means such as a double-faced tape.

Here, in the present embodiment, the air hole 21*c* is oriented (up-down direction) in the direction of assembling the electric motor 40 to the lower housing 20 (from above downward). Therefore, the electric motor 40 is assembled to the lower housing 20 in the same direction as the moisture permeable waterproof material 16, to have favorable assembling property. In addition, the bottom 21*l*, on which the electric motor 40 is arranged, has a structure which does not hinder the moisture permeable waterproof material 16 from being assembled to the lower housing 20. This allows the moisture permeable waterproof material 16 to be easily assembled.

Further, in the present embodiment, the air hole 21*c* is oriented (up-down direction) in the direction of assembling the upper housing 30 to the lower housing 20 (up-down direction). Therefore, the air hole 21*c* is formed in the direction of clamping and demolding the mold, which is the direction of assembling the housing 11, so that no complicated structure such as a slide core is required to allow the housing 11 to have a simple mold structure.

<Operation of Actuator>

Next, operation of the actuator 10 of the present embodiment will be described with reference to FIGS. 5 and 6 (and with reference to other drawings as appropriate). FIG. 5 shows the initial state of the actuator 10.

<<Restriction Operation>>

When the charging connector 4 is plugged into the power receiving connector 3 in the initial state shown in FIG. 5, a control unit (not shown) of the vehicle 1 (see FIG. 1) is energized to output a signal for driving the electric motor 40 (in the normal direction or clockwise). When the gear 41*a* of the electric motor 40 is rotated clockwise, as viewed from the left side of the actuator 10 (the same applies to following cases), its driving force is transmitted to the cam gear 62 via the transmission members 70, 80 to rotate the cam gear 62 counterclockwise. When the cam gear 62 is rotated counterclockwise, the first cam 63 is rotated to abut on the inner peripheral surface of the cam receiving frame 51 (see FIG. 3) after the first cam 63 has been rotated by a predetermined angle, so that the first cam 63 depresses the cam receiving frame 51. This makes the lock pin 52 (see FIG. 3) move downward to cause the amount of the lock pin 52 protruding from the housing 11 to increase.

When the lock pin 52 moves downward to cause the second cam 64 of the cam member 60 to press the switch 91 of the sensor 90, a detection signal is outputted from the sensor 90 to the substrate 100, and additionally to the control unit of the vehicle 1. This output triggers charging the vehicle 1. At the time when the output shaft 41 of the electric motor 40 has stopped rotating, the lock pin 52 is fitted into the fitting hole 4*c* formed in the charging connector 4 through the insertion hole 3*k* formed in the power receiving connector 3, as shown in FIG. 1. This makes the lock pin 52 restrict the charging connector 4 from coming off the power receiving connector 3 (restricting state). After the control unit of the vehicle 1 detects the lock pin 52 moving downward, charging from the charging device (not shown) to the storage battery (not shown) is started.

Note that the lock pin 52 protrudes downward from the lower housing 20 in the present embodiment, but is not limited to this configuration. The lock pin 52 of the separation restricting member 50 may be oriented forward, rearward, or upward and corresponding insertion holes may be provided in the lower housing 20 and the upper housing 30, as in a case of the lock pin 52 protruding forward or rearward (closer to, or away from, the charging connector 4), or upward.

<<Restriction Release Operation>>

When the charging is stopped or completed, the control unit of the vehicle 1 (see FIG. 1) outputs a signal for driving the electric motor 40 (in the reverse direction or counterclockwise) to the substrate 100. When the gear 41*a* of the electric motor 40 is rotated counterclockwise in the restricting state in FIG. 1, its driving force is transmitted to the cam gear 62 via the transmission members 70, 80 to rotate the cam gear 62 clockwise. When the cam gear 62 is rotated clockwise, the first cam 63 is rotated to abut on the inner peripheral surface of the cam receiving frame 51 (see FIG. 3) after the first cam 63 has been rotated by a predetermined angle, so that the first cam 63 presses the cam receiving frame 51 upward. This makes the lock pin 52 (see FIG. 3) move upward to cause the amount of the lock pin 52 protruding from the housing 11 to decrease.

When the lock pin 52 moves upward to cancel the second cam 64 of the cam member 60 pressing the switch 91 of the sensor 90, a release signal is outputted from the sensor 90 to the substrate 100. The substrate 100 controls to stop rotating the output shaft 41 of the electric motor 40 after rotating the output shaft 41 of the electric motor 40 a predetermined number of times (or, after a predetermined time has elapsed). At the time when the electric motor 40 has stopped rotating the output shaft 41, the lock pin 52 is positioned at the initial position where the charging connector 4 is not prevented from coming off. This makes the lock pin 52 release restricting the charging connector 4 from coming off the power receiving connector 3 (initial state), to allow the user to remove the charging connector 4 from the power receiving connector 3.

Figure 8:
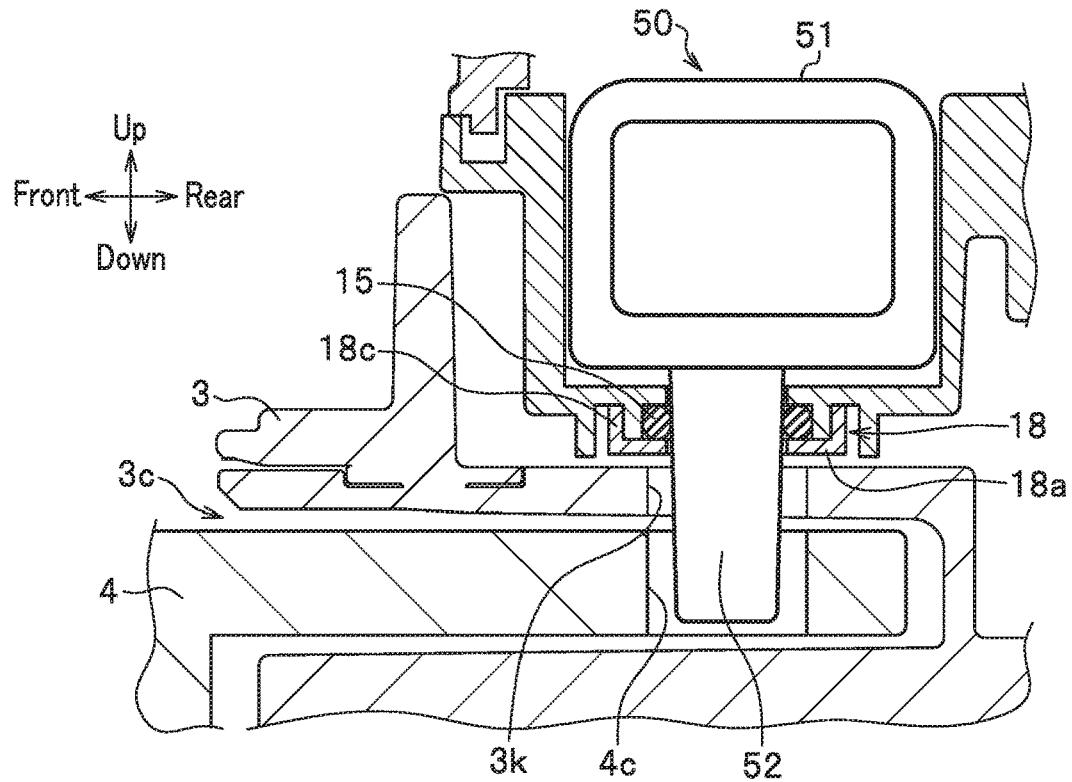
FIG. 8 is a diagram illustrating the actuator according to the embodiment in a restricted state.

Note that a description will be given of a case where the charging connector 4 is forcibly removed from the power receiving connector 3 by the user, in the restricting state shown in FIG. 8. In the restricting state, if the charging connector 4 is forcibly removed from the power receiving connector 3, the lock pin 52 may be snapped from the base. Once the lock pin 52 is snapped from the base, a snapped fragment of the lock pin 52 has a risk of being caught in the insertion hole 3*k* of the power receiving connector 3 and the fitting hole 4*c* of the charging connector 4, to hinder the charging connector 4 from being removed.

Figure 9:
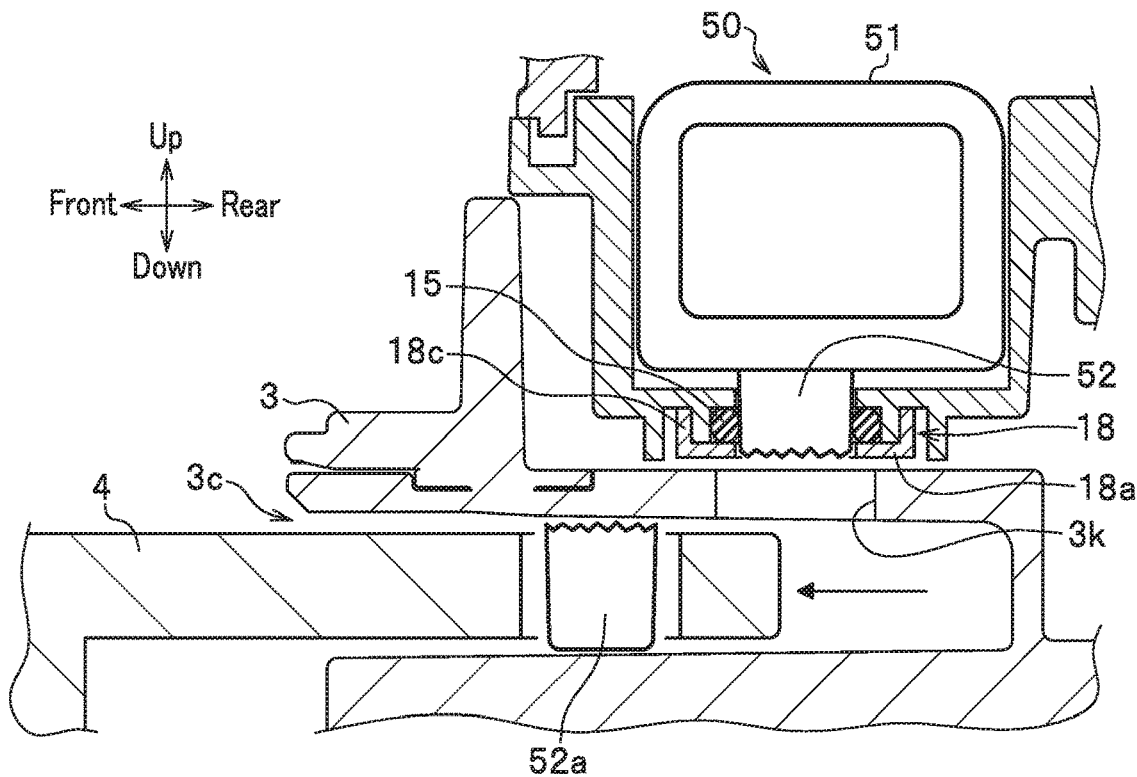
FIG. 9 is a diagram illustrating the charging connector being forcibly removed when the actuator according to the embodiment is in a restricting state.

Therefore, in the present embodiment, the lock pin 52 is configured to be snapped at a position closer to the front end thereof. Specifically, when the charging connector 4 is forcibly removed from the power receiving connector 3, the lock pin 52 abuts against the fitting hole 4*c* of the charging connector 4 so as to be pressed and bent to have the maximum bending stress at a part where the lock pin 52 abuts against the O-ring attachment 18. Then, as shown in FIG. 9, if the charging connector 4 is removed with a force equal to or larger than a predetermined value, the lock pin 52 is snapped below the O-ring attachment 18.

A snapped piece 52*a* of the lock pin 52 is discharged to the outside in a state of being contained in the fitting hole 4*c* of the charging connector 4. This prevents a situation from occurring in which the snapped piece 52*a* of the lock pin 52 remains in the insertion hole 3 *k* of the power receiving connector 3, if the charging connector 4 is forcibly removed from the power receiving connector 3 by the user, to hinder the charging connector 4 form being removed. Note that the mounting position (height) of the O-ring attachment 18 may suitably be set to adjust the position where the lock pin 52 is snapped. In other words, the mounting position (height) of the O-ring attachment 18 is suitably set to such an extent that the snapped piece 52*a* of the lock pin 52 is discharged to the outside.

<<Forced Release Operation>>

The actuator 10 of the present embodiment allows the lock pin 52 to be manually moved to the initial position, if the restricting state (see FIG. 1) continues even after completion of charging for some reason (failure of the electric motor 40, for example). In such a case, the user manually rotates the dial 120 in FIG. 3 toward the arrowed direction (clockwise) indicated on the upper housing 30. The driving force of turning the dial 120 is transmitted to the cam gear 62 via the transmission members 70, 80, to rotate the cam gear 62 clockwise. When the cam gear 62 is rotated clockwise, the first cam 63 is rotated to abut on the inner peripheral surface of the cam receiving frame 51 (see FIG. 3) after the first cam 63 has been rotated by a predetermined angle, so that the first cam 63 presses the cam receiving frame 51 upward. This allows the lock pin 52 to be housed in the lower housing 20 without the driving force of the electric motor 40.

According to the present embodiment as described above, the air hole 21*c* is formed in the member surrounding the electric motor 40. Therefore, grease (lubricant) is prevented from scattering to the moisture permeable waterproof material 16 and the air hole 21*c*, even when an air path in a labyrinth shape or the like is not separately arranged. This allows the actuator 10 to be smaller in size and to have a simpler structure, as compared with a conventional one.

In addition, according to the present embodiment, the air hole 21*c* is formed in the bottom 21 of the lower housing 20. This allows the air warmed by the electric motor 40 to be quickly discharged to the outside, to improve effects of dissipating heat of the electric motor 40.

Further, according to the present embodiment, the air hole 21*c* is oriented in a direction of assembling the electric motor 40. This allows the electric motor 40 to be assembled to the housing 11 in the same direction as the moisture permeable waterproof material 16, to improve an assembling property.

Furthermore, according to the present embodiment, the housing 11 includes the lower housing 20 and the upper housing 30, and the air hole 21*c* is oriented in a direction of assembling the upper housing 30 to the lower housing 20. This allows the air hole 21*c* to be oriented in a direction of clamping and demolding the mold, which is the direction of assembling the housing 11, to simplify the structure of the mold of the housing 11. This reduces manufacturing costs of the mold.

Hereinabove, the embodiment of the present invention has been described, but the present invention is not limited thereto and can be modified as appropriate without departing from the spirit of the present invention.

For example, the power receiving connector 3 in FIG. 1 may have its axis inclined with respect to the horizontal plane so as to extend downward toward the inside of the vehicle, depending on the position where the charging port 2*a* is arranged. In this case, the actuator 10 is installed in the vehicle 1 in a state of declining toward its rear end with respect to the horizontal plane as with the power receiving connector 3.

In addition, the air hole 21*c* is formed in the bottom 21*l* of the lower housing 20 in the present embodiment, but the air hole 21*c* may be formed in another member which surrounds the electric motor 40 (except a member or members that act or acts as a grease-scattering prevention wall). For example, the air hole 21c may be formed in the ceiling 31 or rear wall 29 of the upper housing 30 so that the motor box communicates with the outside.

The invention claimed is:

1. An actuator comprising:
   a driving mechanism that includes:
      an electric motor having a motor housing, and
      a transmission member supplied with lubricant; and
   an actuator housing that houses the driving mechanism and includes:
      an air hole that communicates the inside of the actuator housing with the outside thereof,
      a filter that covers the air hole, and
      a motor box that includes members integrally formed with the actuator housing, the motor box surrounding the motor housing so as to isolate the electric motor from an outside of the motor box,
   wherein the motor box includes a ceiling, a bottom, and peripheral walls, the motor housing being fixed by the peripheral walls to the motor box, and
   wherein at least one of the members of the motor box acts as a scattering prevention wall that prevents the lubricant from scattering to the electric motor, and the air hole is formed in one of the members of the motor box other than said at least one of the members of the motor box.

2. The actuator according to claim 1, wherein the air hole is formed in at least one of the ceiling and the bottom.

3. The actuator according to claim 1, wherein the air hole is oriented in the direction of assembling the electric motor.

4. The actuator according to claim 1, wherein the actuator housing includes a lower housing on a lower side and an upper housing on an upper side, and the air hole is oriented in the direction of assembling the upper housing to the lower housing.

5. The actuator according to claim 1, wherein the one of the members of the motor box other than said at least one of the members of the motor box, in which the air hole is formed, is defined by a supporting wall on which the electric motor is placed.

6. The actuator according to claim 1, wherein the air hole is positioned at an outer circumferential surface of the electric motor.

* * * * *